(12) United States Patent
Dubey et al.

(10) Patent No.: US 12,455,805 B2
(45) Date of Patent: Oct. 28, 2025

(54) HIGH PERFORMANCE TRACE OFFLOAD CIRCUIT ARCHITECTURE

(71) Applicant: Xilinx, Inc., San Jose, CA (US)

(72) Inventors: Anurag Dubey, Boulder, CO (US); Paul Robert Schumacher, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 142 days.

(21) Appl. No.: 18/342,615

(22) Filed: Jun. 27, 2023

(65) Prior Publication Data

US 2025/0004919 A1 Jan. 2, 2025

(51) Int. Cl.
*G06F 11/34* (2006.01)
*G06F 11/07* (2006.01)

(52) U.S. Cl.
CPC ........ *G06F 11/348* (2013.01); *G06F 11/0778* (2013.01); *G06F 11/3476* (2013.01); *G06F 11/0706* (2013.01); *G06F 11/3409* (2013.01)

(58) Field of Classification Search
CPC ............. G06F 11/0706; G06F 11/0778; G06F 11/3409; G06F 11/3476; G06F 11/348
See application file for complete search history.

(56) References Cited

U.S. PATENT DOCUMENTS

| | | | | |
|---|---|---|---|---|
| 6,493,837 B1 * | 12/2002 | Pang | ................ | G06F 11/3466 |
| | | | | 714/45 |
| 6,918,065 B1 * | 7/2005 | Edwards | ............ | G06F 11/348 |
| | | | | 714/45 |
| 7,490,227 B1 | 2/2009 | Bilski et al. | | |
| 8,042,007 B1 | 10/2011 | Chan et al. | | |
| 8,117,577 B1 | 2/2012 | Vadi et al. | | |
| 10,346,572 B1 | 7/2019 | Corbett et al. | | |
| 10,474,610 B1 | 11/2019 | Schelle et al. | | |
| 2004/0268314 A1 * | 12/2004 | Kollman | ............ | G06F 11/3476 |
| | | | | 714/E11.204 |
| 2007/0220361 A1 * | 9/2007 | Barnum | ............ | G06F 11/3636 |
| | | | | 714/45 |
| 2012/0260131 A1 * | 10/2012 | Mayer | ................ | G06F 11/267 |
| | | | | 714/E11.178 |
| 2013/0198418 A1 * | 8/2013 | Swoboda | ............ | G06F 5/065 |
| | | | | 710/52 |
| 2013/0339591 A1 * | 12/2013 | Takahashi | ............ | G06F 12/00 |
| | | | | 711/104 |
| 2015/0254160 A1 * | 9/2015 | Horley | ............ | G06F 11/3065 |
| | | | | 714/45 |
| 2017/0103157 A1 * | 4/2017 | Hutton | ............ | H03K 19/17756 |
| 2024/0078115 A1 * | 3/2024 | Strong | ............ | G06F 9/3005 |

* cited by examiner

*Primary Examiner* — Marc Duncan
*Assistant Examiner* — Albert Li
(74) *Attorney, Agent, or Firm* — Kevin T. Cuenot

(57) ABSTRACT

An integrated circuit includes a compute circuit and a trace data mover circuit coupled to the compute circuit. The trace data mover circuit is configured to convey trace data generated by the compute circuit to a destination circuit. The trace data mover circuit includes a controller circuit configured to receive a stream of trace data from the compute circuit and generate instructions for writing the trace data. The trace data mover circuit includes a writer circuit configured to write the trace data to the destination circuit responsive to the instructions generated by the controller circuit.

15 Claims, 12 Drawing Sheets

108

HIGH PERFORMANCE TRACE OFFLOAD CIRCUIT ARCHITECTURE

TECHNICAL FIELD

This disclosure relates to integrated circuits (ICs) and, more particularly, to a trace offload circuit architecture for offloading trace data from an IC.

BACKGROUND

Modern integrated circuits (ICs) include a variety of different types of compute circuits. Examples of compute circuits that may be included in an IC include, but are not limited to, one or more processors configured to execute program code, one or more dedicated and hardened circuit blocks configured to perform particular tasks, one or more user-specified circuits implemented in programmable circuitry (e.g., programmable logic), a data processing array, a graphics processing unit (GPU), or the like. In developing a design for an IC, it is often necessary to collect trace data from the compute circuits to ensure that the design is operating as intended and/or to debug the design.

To ensure that compute circuits and any systems incorporating compute circuits are operating as intended, trace is often utilized. "Trace" refers to a process and technology that facilitates the capture of data that illustrates how the components of a circuit architecture are operating. The quantity of data generated by different types of compute circuits may vary significantly. Particular compute circuits are known for generating large quantities of data during runtime and generating large quantities of trace data. One class of compute circuit that is capable of generating a large quantity of data at runtime and a large quantity of trace data is referred to as Coarse Grain Reconfigurable Architecture (CGRA) type compute circuits.

CGRAs are characterized by the inclusion of a large number of functional units (e.g., functional circuits) interconnected using a networking technology such as mesh. In some cases, the functional units perform various operations such as multiplication, addition, and/or subtraction. In some cases, CGRAs are implemented as an array of tiles (circuit blocks), where the tiles include processing elements and memories. As their name suggests, CGRAs are reconfigurable. In general, CGRAs operate on coarser granularity than other reconfigurable architectures such as Field Programmable Gate Arrays (FPGAs). While not providing gate-level reconfigurability, CGRAs do provide other benefits such as, for example, increased power efficiency, increased computational efficiency, and/or shorter reconfiguration times.

SUMMARY

In one or more example implementations, an integrated circuit includes a compute circuit and a trace data mover circuit coupled to the compute circuit. The trace data mover circuit is configured to convey trace data generated by the compute circuit to a destination circuit. The trace data mover circuit includes a controller circuit configured to receive a stream of trace data from the compute circuit and generate instructions for writing the trace data. The trace data mover circuit also includes a writer circuit configured to write the trace data to the destination circuit responsive to the instructions generated by the controller circuit.

The foregoing and other implementations can each optionally include one or more of the following features, alone or in combination. Some example implementations include all the following features in combination.

In some aspects, the controller circuit is coupled to the writer circuit through a plurality of queues.

In some aspects, the plurality of queues includes a data queue configured to store the trace data and an instruction queue configured to store the instructions generated by the controller circuit.

In some aspects, the controller circuit is configured to instruct the writer circuit to flush data from the data queue in response to receiving a flush request.

In some aspects, an amount of data flushed in response to the flush request is less than an amount of data for a burst data transfer.

In some aspects, the writer circuit obtains the instructions from the instruction queue and, in response to execution of the instructions as obtained, writes the trace data to the destination circuit.

In some aspects, the compute circuit is implemented as a Coarse Grain Reconfigurable Architecture (CGRA) compute circuit.

In some aspects, the compute circuit is implemented as a data processing array.

In some aspects, the integrated circuit includes programmable logic coupled to the compute circuit. The trace data mover circuit is implemented in the programmable logic.

In some aspects, the destination circuit is a memory.

In some aspects, the integrated circuit includes a network-on-chip coupling the trace data mover circuit to the destination circuit.

In some aspects, the trace data mover circuit is runtime configurable.

In some aspects, the trace data mover circuit conveys the trace data using burst data transfers having a configurable size.

In some aspects, the trace data mover circuit is configurable to write data to the destination circuit using a linear mode or a circular mode.

In one or more example implementations, a method includes, in response to receiving, by a controller circuit of a trace data mover circuit, a data stream of trace data from a compute circuit, storing the trace data within a data queue of the trace data mover circuit. The method includes generating, by the controller circuit, a plurality of instructions for writing the trace data to a destination circuit and storing the plurality of instructions in an instruction queue of the trace data mover circuit. The method includes writing, by a writer circuit, the trace data obtained from the data queue to the destination circuit in response to executing the plurality of instructions obtained from the instruction queue.

The foregoing and other implementations can each optionally include one or more of the following features, alone or in combination. Some example implementations include all the following features in combination.

In some aspects, the writer circuit writes the trace data to the destination circuit using burst data transfers.

In some aspects, a size of the burst data transfers is configurable.

In some aspects, the writer circuit is configurable to write the trace data to the destination circuit using a linear mode or a circular mode.

In some aspects, the method includes instructing, by the controller circuit, the writer circuit to flush data from the data queue in response to receiving a flush request.

In some aspects, an amount of data flushed in response to the flush request is less than an amount of data for a burst data transfer.

In one or more example implementations, a system includes one or more hardware processors configured (e.g., programmed) to initiate and/or execute operations as described within this disclosure.

In one or more example implementations, a computer program product includes one or more computer readable storage mediums having program instructions embodied therewith. The program instructions are executable by computer hardware, e.g., a hardware processor, to cause the computer hardware to initiate and/or execute operations as described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
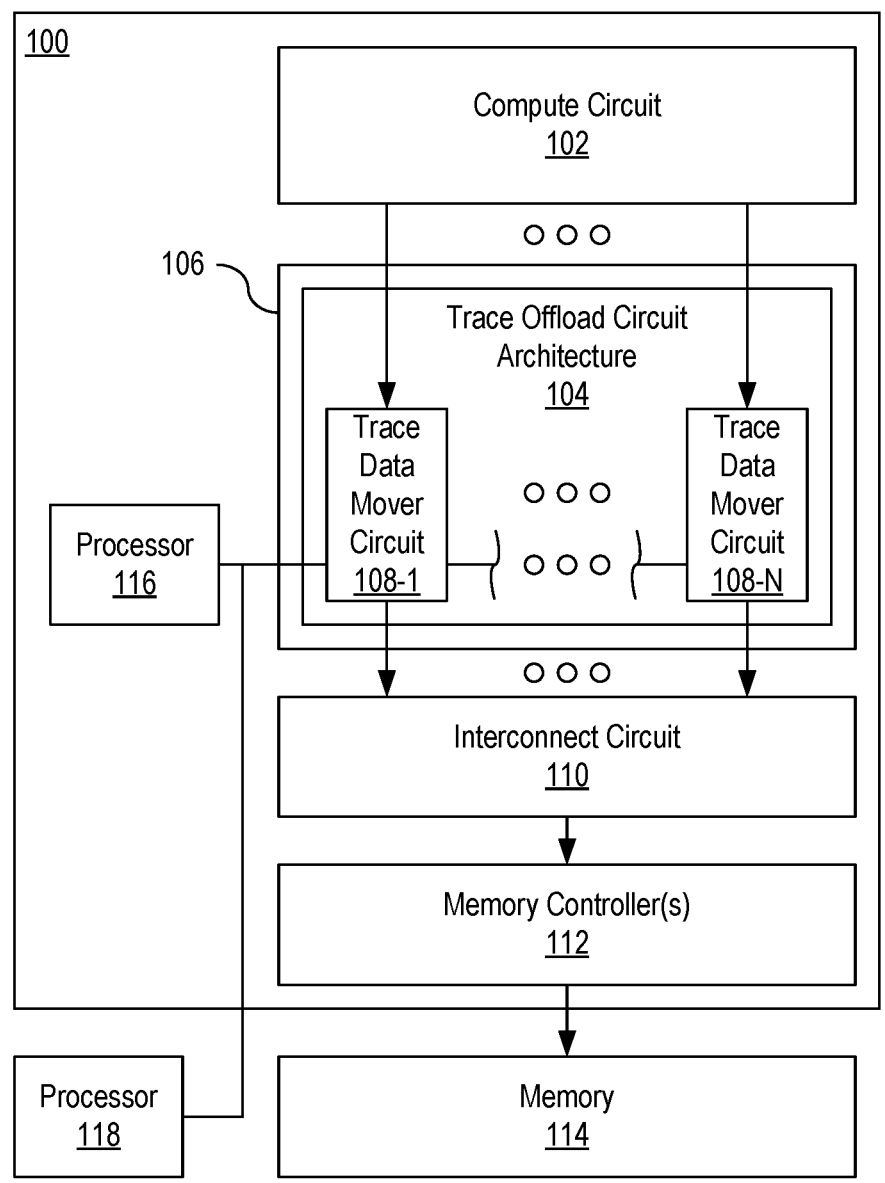
FIG. 1 illustrates an example of an integrated circuit (IC) including a compute circuit and a trace offload circuit architecture.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to a trace offload circuit architecture for offloading trace data from an IC. Hardware event trace provides significant visibility into the operation of a circuit design but is nondeterministic in nature. For example, a processor experiencing frequent stalls might generate many more trace events (e.g., trace data), compared to another processor that is not experiencing frequent stalls. For tracing purposes, bandwidth requirements are typically low. In the case of a compute circuit that includes many functional units, potentially tens of hundreds of gigabytes of trace data may be generated per second. This amount of trace data may overwhelm conventional trace data offload circuit architectures.

In accordance with the inventive arrangements described within this disclosure, a trace offload circuit architecture is provided for use in an IC. The trace offload circuit architecture is capable of operating at a high level of performance to convey large amounts of trace data, as generated by one or more functional units of a compute circuit, to a target destination. The target destination is typically one located off-chip.

Conventional data movers have limitations that make them unsuitable for trace applications. Conventional data movers only work on predetermined amounts of data. In the usual case, an application is implemented in an IC such that the amounts of data to be transferred are known a priori and are known to the data mover. In the case of trace, the amount of trace data that will be generated and the time window in which that trace data will be generated is often unknown.

Most conventional data movers only write data in a single format (e.g., linear) and may not be stopped once execution begins. Further, conventional data movers typically write data in bursts, but are limited to a single predetermined burst length. If the incoming data stops for any reason, a conventional data mover will experience a hang (e.g., become unresponsive) because the circuit expects to buffer an amount of data equivalent to the "burst-length" before the data mover can write the data out from memory. In the case of a hang, there may be useful data stored in the data mover buffer that cannot be flushed out. The amount of data, for example, may be less than that required to perform a burst data transfer. Often, trace is important for debugging application crashes. It is also important to have visibility into the operation of a device leading up to the moment of a crash or a software/hardware hang. Such scenarios are not supported in conventional trace offload architectures.

The trace offload circuit architecture disclosed herein includes one or more trace data mover circuits. The trace data mover circuits are tailored to the needs of a trace environment. The trace data mover circuits are suited for efficient offload of trace data despite not knowing the amount of data being transferred. The trace data mover circuits are capable of accepting an indefinite amount of data and writing that data to a memory. The trace offload circuit architecture described herein may include a plurality of trace data mover circuits operating concurrently in parallel. This allows the trace offload circuit architecture to move large amounts of data to meet the high bandwidth requirements for performing trace in certain types of compute circuits.

In one or more examples, the data mover circuits of the trace offload circuit architecture may have one or more operational settings that may be configured at compile time. The trace data mover circuits may have one or more operational settings that may be configured at runtime. Through the use of compilation time and/or runtime parameters, operation of the trace offload circuit architecture may be modified to achieve a desired performance level.

The trace data mover circuits provide a pipelined hardware architecture capable of taking advantage of burst data transfer capabilities. The trace data mover circuits also may be flushed upon request at any point in time. The trace data mover circuits are capable of providing synchronized operation with a corresponding reader. The synchronization allows partial trace in cases of an application hang or crash. The trace data mover circuits also are capable of writing trace data in a linear or a circular fashion.

The high performance achieved by the trace offload circuit architecture described herein is suitable for use with compute circuit(s) that generate large quantities of trace data. For example, the trace offload circuit architecture described herein may be used to efficiently offload trace data from various types of compute circuits considered Coarse Grain Reconfigurable Architectures (CGRAs). Such compute circuits include a plurality of functional units each capable of generating trace data at runtime.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of an integrated circuit (IC) 100. IC 100 may be implemented as any of a variety of different types of ICs including, but not limited to, a programmable IC, an adaptive system, and/or a System-on-Chip (SoC). In the example of FIG. 1, IC 100 is implemented on a single die provided within a single package. In other examples, IC 100 may be implemented using a plurality of interconnected dies within a single package where the various resources of IC 100 (e.g., circuits) illustrated in FIG. 1 are implemented across the different interconnected dies.

IC 100 includes a compute circuit 102 coupled to a trace offload circuit architecture 104. IC 100 also includes programmable logic 106, which is used in the example to implement trace offload circuit architecture 104. Trace offload circuit architecture 104 is coupled to an optional interconnect circuit 110. In one or more examples, interconnect circuit 110 is implemented as a Network-on-Chip (NoC). Interconnect circuit 110 is coupled to one or more memory controllers 112 that are configured to access (e.g., read and/or write) memory 114. In the example, trace offload circuit architecture 104 includes one or more trace data mover circuits 108-1 through 108-N.

In one or more examples, compute circuit 102 is implemented to include a plurality of functional circuits. Compute circuit 102 may be a CGRA type of compute circuit that is capable of generating, at runtime, a large quantity of trace data. The functional circuits may be interconnected using a networking technology such as a mesh network, streaming interconnects, and/or a combination of other interconnects. During runtime, one or more or all of the functional units may generate trace data that is to be offloaded from compute circuit 102 and out from IC 100.

In the example, each connection from compute circuit 102 to trace offload circuit architecture 104 may be used exclusively to convey trace data. In this regard, the example of FIG. 1 does not illustrate connections between compute circuit 102 and other circuits and/or subsystems of IC 100 that convey input data and/or output data (e.g., where input data is non-trace data and output data is non-trace data generated during operation of compute circuit 102). Further, connections intended for configuring compute circuit 102 are not illustrated.

Each data mover circuit 108 is capable of receiving a data stream of trace data from compute circuit 102. Each trace data mover circuit 108 may be used exclusively for handling trace data generated by compute circuit 102. That is, other data that is provided to compute circuit 102 as input and/or generated by compute circuit 102 as output that is not trace data may be conveyed over other data paths. The particular number of trace data mover circuits 108 may be a configurable parameter. A user may specify the number of trace data mover circuits 108 to be implemented in trace offload circuit architecture 104 at compile time.

Trace data mover circuits 108 are coupled to one or more memory controllers 112 through optional interconnect circuit 110. In one aspect, trace data mover circuits 108 are coupled to a plurality of memory controllers 112 on a one-to-one basis, e.g., where each trace data mover circuit 108 is coupled it its own dedicated memory controller 112 (e.g., one-to-one connections). In one or more other examples, trace data mover circuits 108 may be coupled to one or more memory controllers 112 where a plurality of trace data mover circuits 108 may be coupled to a same memory controller 112 (e.g., many-to-one connections). In one or more examples, each trace data mover 108 is capable of independently writing to its own memory bank of memory 114.

Through memory controller(s) 112, data mover circuits 108 write data to memory 114. Memory 114 is illustrated as being an "off-chip" memory. Memory 114 may be a volatile memory such as a random-access memory. In some examples, memory 114 may be a Double Data Rate Synchronous Dynamic RAM (e.g., a DDR memory). It should be appreciated, however, that memory 114 may be implemented as any of a variety of non-volatile memory devices.

In the example, operation of trace offload circuit architecture 104 and/or compute circuit 102 may be controlled by a processor referred here from time-to-time as a "host" or "host processor." The host processor may be implemented within IC 100 (e.g., as an embedded processor) illustrated as processor 116. In other examples, the host processor may be a processor that is external to IC 100 and illustrated as processor 118.

Figure 2:
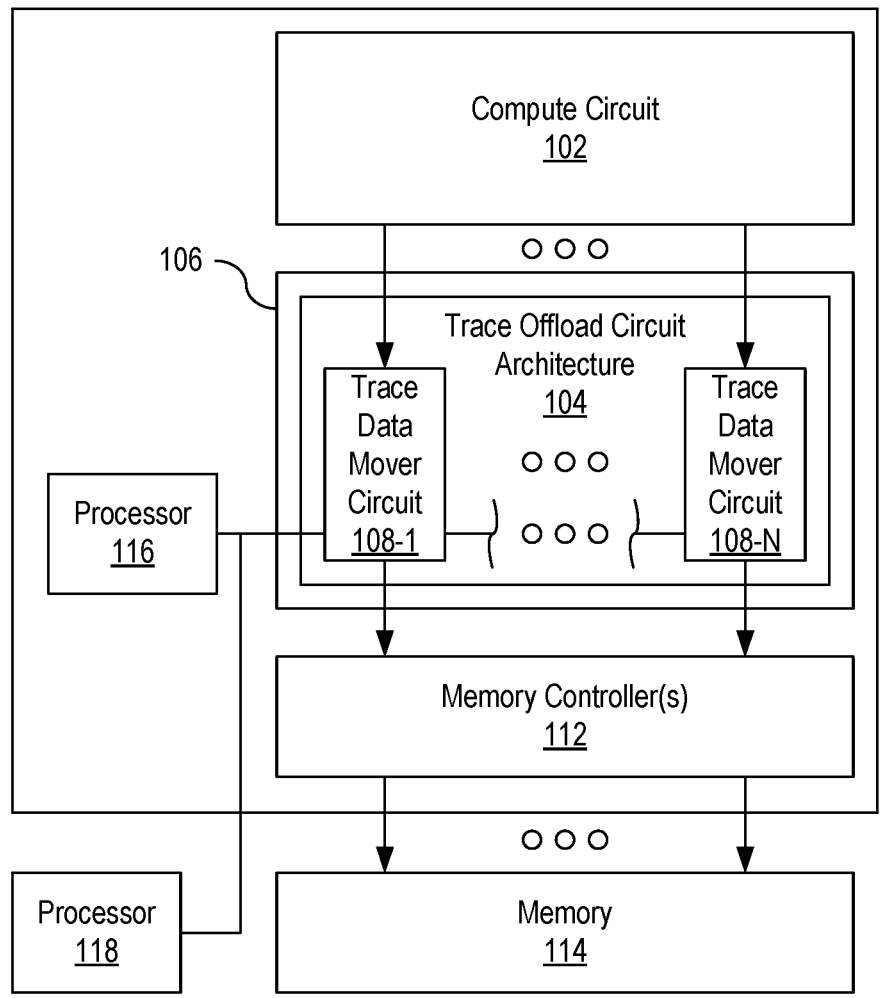
FIG. 2 illustrates another example of an IC including a compute circuit and a trace offload circuit architecture.

FIG. 2 illustrates another example of IC 100. IC 100 of FIG. 2 may be implemented substantially similar to the example of FIG. 1. In the example of FIG. 2, however, interconnect circuit 110 has been omitted. As shown, trace offload circuit architecture 104 is coupled directly to the one or more memory controllers 112 without interconnect circuit 110 intervening.

For ease of illustration, within FIGS. 1 and 2, the plurality of functional units included in compute circuit 102 are not shown. In one or more examples, the functional units may be circuit blocks capable of performing operations such as multiplication, subtraction, and/or addition. In one or more other examples, the functional units may be graphics processing units (GPUs), digital signal processing units (DSPs), or the like.

Figure 3:
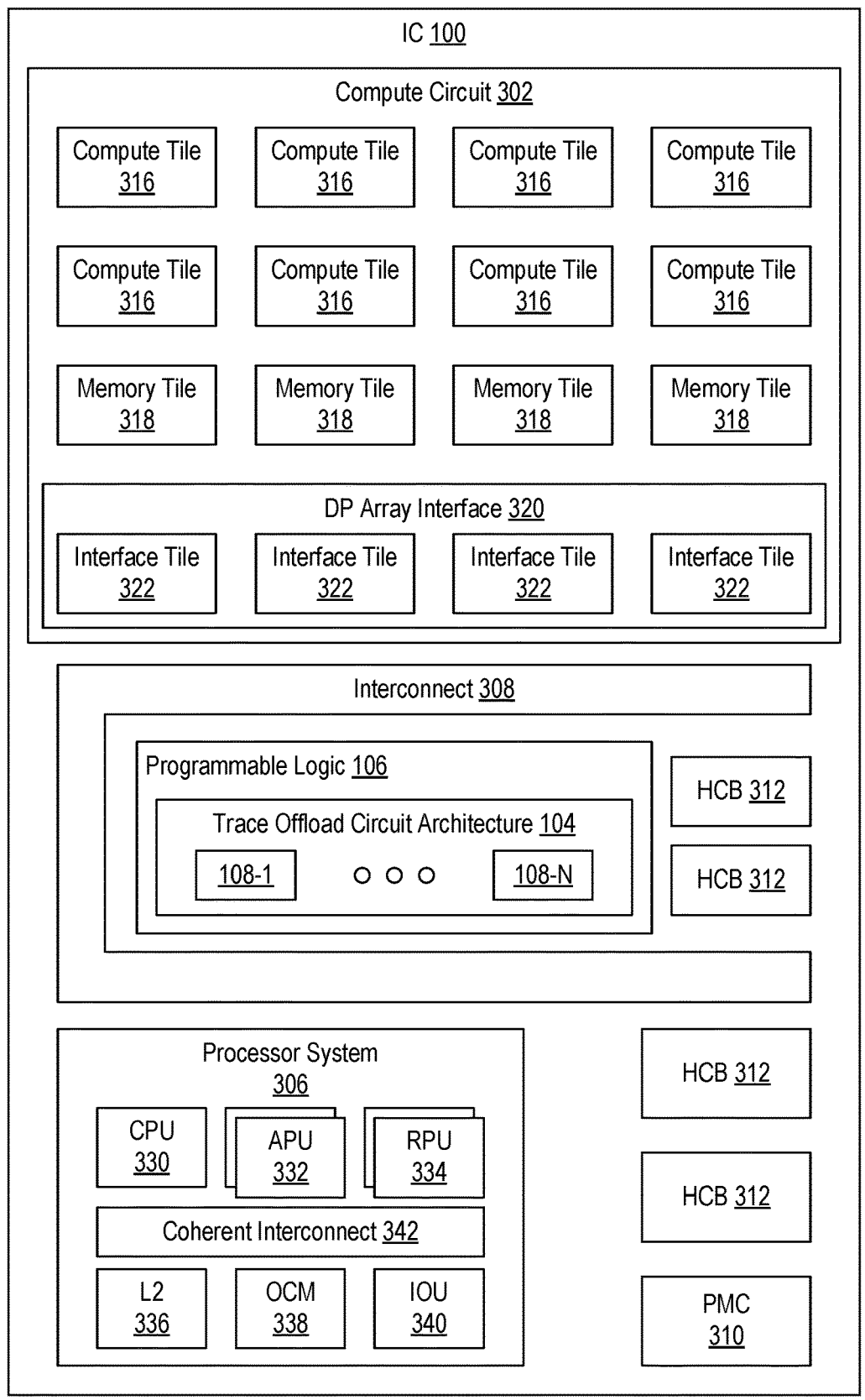
FIG. 3 illustrates another example of an IC including a compute circuit and a trace offload circuit architecture.

FIG. 3 illustrates another example of IC 100. In the example of FIG. 3, compute circuit 102 is implemented as data processing (DP) array 302. Interconnect circuit 110 is implemented as NoC 308. IC 100 includes additional subsystems such as programmable logic 106 in which trace offload circuit architecture 104 is implemented, a processor system 306, an optional platform management controller (PMC) 310, and one or more hardwired circuit blocks (HCBs) 312.

DP array 302 is implemented as a plurality of interconnected and programmable tiles. The term "tile," as used herein, means a block or portion of circuitry also referred to as a "circuit block." As illustrated, DP array 302 includes a plurality of compute tiles 316 organized in an array and optionally a plurality of memory tiles 318. For example, memory tiles 318 may be replaced by additional compute tiles 316. DP array 302 also includes a DP array interface 320 having a plurality of interface tiles 322. For purposes of illustration, compute tiles 316, memory tiles 318, and interface tiles 322 are examples of functional units where DP array 302 is an example of a CGRA type of compute circuit 102.

In the example, compute tiles 316, memory tiles 318, and interface tiles 322 are arranged in an array (e.g., a grid) and are hardwired. Each compute tile 316 can include one or more cores and a memory (e.g., a RAM). Each memory tile 318 may include a memory (e.g., a RAM). In one example implementation, cores of compute tiles 316 may be implemented as custom circuits that do not execute program code. In another example implementation, cores of compute tiles 316 are capable of executing program code stored in core-specific program memories contained within each respective core.

Figure 4A:
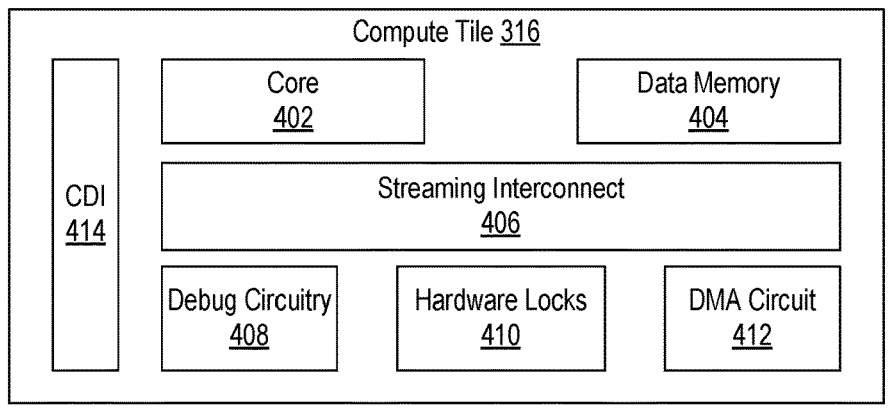
FIGS. 4A, 4B, and 4C illustrate example implementations of different types of tiles of a compute circuit.

FIG. 4A illustrates an example implementation of a compute tile 316. In the example, compute tile 316 includes a core 402, a data memory 404, a streaming interconnect 406, debug circuitry 408, hardware locks 410, a direct memory access (DMA) circuit 412, and a configuration and debug interface (CDI) 414. Core 402 may be implemented with a Very-Long Instruction Word architecture. In one or more examples, core 402 may be implemented as a vector processor capable of performing both fixed and floating-point operations and/or a scalar processor. As discussed, however, in other examples, core 402 may be implemented as dedicated circuitry capable of performing a particular function (e.g., multiplication, addition, subtraction, and the like). Data memory 404 may be implemented as a RAM.

In the example, core 402 is capable of directly accessing the data memory 404 in the same compute tile and in other adjacent compute tiles 316. Core 402 also has direct connections to other cores 402 in adjacent compute tiles 316 so that data may be conveyed directly between cores 402 without writing such data to a data memory 404 (e.g., without using shared memory to communicate data) and/or without conveying data over a streaming interconnect 406.

Streaming interconnect 406 provides dedicated multi-bit data movement channels connecting to streaming interconnects 406 in each adjacent tile in the north, east, west, and south directions of DP array 302. Debug circuitry 408 is capable of detecting particular events (e.g., hardware and/or software events) occurring in circuit blocks of compute tile 316 and outputting the trace data to streaming interconnect 406 in response to detecting the events. The trace data may be output over streaming interconnect 406. Streaming interconnect 406 may include a plurality of ports for conveying application data (e.g., input and/or output non-trace data) where one or more of the ports also may be used to convey trace data. DMA circuit 412 is coupled to streaming interconnect 406 and is capable of performing DMA operations to move data in to and out from data memory 404 by way of streaming interconnect 406. Hardware locks 410 facilitate the safe transfer of data to/from data memory 404 and other adjacent and/or non-adjacent tiles. CDI 414 may be implemented as a memory mapped interface providing read and write access to any memory location within compute tile 316. Compute tile 316 may include other circuit blocks not illustrated in the general example of FIG. 4A.

Figure 4B:
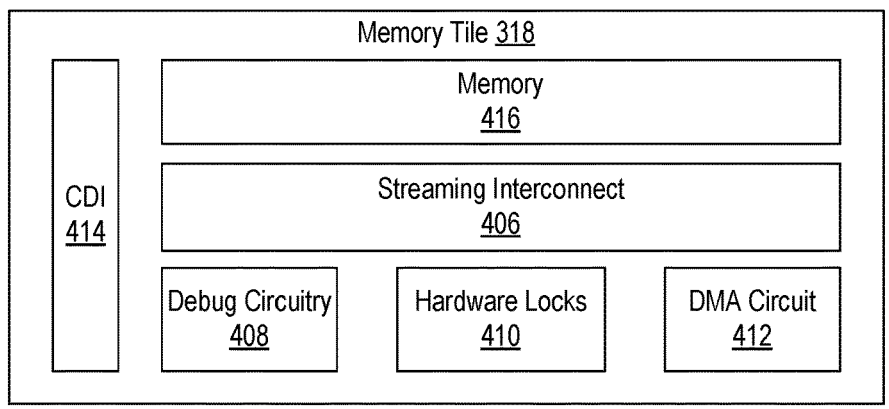

FIG. 4B illustrates an example implementation of a memory tile 318. In the example, memory tile 318 includes a memory 416, a streaming interconnect 406, debug circuitry 408, hardware locks 410, a DMA circuit 412, and a CDI 414. Memory 416 may have a larger capacity than data memory 404. Debug circuitry 408 is capable of detecting particular events occurring in circuit blocks of memory tile 318 and outputting the trace data to streaming interconnect 406 in response to detecting the events. As discussed, streaming interconnect 406 may include a plurality of ports for conveying application data (e.g., input and/or output non-trace data) where one or more of the ports also may be used to convey trace data. DMA circuit 412 of each memory tile 318 may access the memory 416 within the same tile as well as the memory 416 of one or more adjacent memory tiles 318. In general, memory tile 318 is characterized by the lack of a core and the inability to execute program code. Alternatively, in the case where core 402 is replaced with a hardened compute circuit or other functional unit, memory tile 318 is characterized by the lack of computational capabilities. Each memory tile 318 may be read and/or written by any of compute tiles 316 and/or interface tiles 322 by way of interconnected streaming interconnects 406. Memory tile 318 may include other circuit blocks not illustrated in the general example of FIG. 4B.

Referring again to FIG. 3, DP array interface 320 connects compute tiles 316 and/or memory tiles 318 to other resources of IC 100. As illustrated, DP array interface 320 includes a plurality of interconnected interface tiles 322 organized in a row. In one example, each interface tile 322 may have a same architecture. In another example, interface tiles 322 may be implemented with different architectures where each different interface tile architecture supports communication with a different type of resource (e.g., subsystem) of IC 100. Interface tiles 322 of DP array interface 320 are connected so that data may be propagated from one interface tile to another bi-directionally. Each interface tile 322 is capable of operating as an interface for the column of compute tiles 316 and/or memory tiles 318 directly above.

Figure 4C:
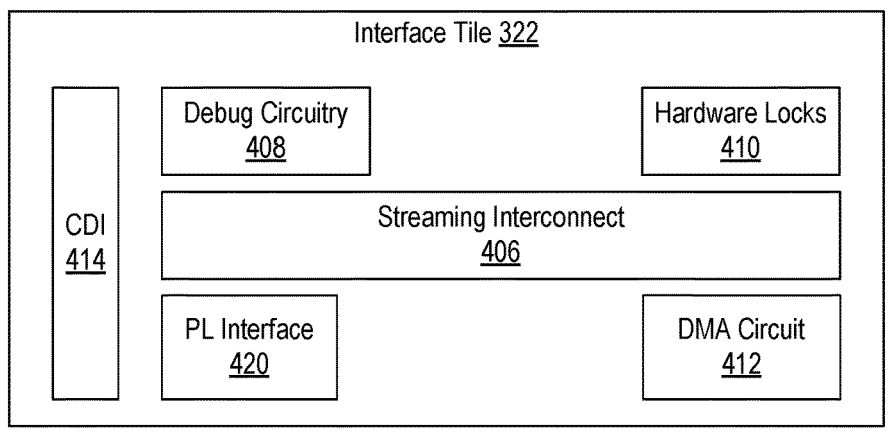

FIG. 4C illustrates an example implementation of an interface tile 322. In the example, interface tile 322 includes a PL (programmable logic) interface 420, a streaming interconnect 406, debug circuitry 408, hardware locks 410, a DMA circuit 412, and a CDI 414. Debug circuitry 408 is capable of detecting particular events occurring in circuit blocks of interface tile 322 and outputting the trace data to streaming interconnect 406 in response to detecting the events. Streaming interconnect 406 may include a plurality of ports for conveying application data (e.g., input and/or output non-trace data) where one or more of the ports also may be used to convey trace data. Similarly, PL interface 420 may include a plurality of ports for conveying application data (e.g., input and/or output non-trace data) where one or more of the ports also may be used to convey trace data.

Interface tile 322 may include other circuit blocks not illustrated in the general example of FIG. 4C. The example interface tile 322 of FIG. 4C is capable of communicating with the programmable logic 106 and circuits implemented therein such as trace data mover circuits 108 via PL interface 420 and NoC 308 via DMA circuit 412. Other example architectures for interface tile 322 may omit PL interface 420 or omit DMA circuit 412.

Referring again to FIG. 3, programmable logic 106 is circuitry that may be programmed to perform specified functions. As an example, programmable logic 106 may be implemented as field programmable gate array type of circuitry. Programmable logic 106 can include an array of programmable circuit blocks. The programmable circuit blocks may include, but are not limited to, RAMs (e.g., block RAMs of varying size), DSP blocks capable of performing various multiplication operations, and/or configurable logic blocks (CLBs) each including one or more flip-flops and a lookup table. As defined herein, the term "programmable logic" means circuitry used to build reconfigurable digital circuits. The topology of programmable logic 106 is highly configurable unlike hardwired circuitry. Connectivity among the circuit blocks of programmable logic 106 may be specified on a per-bit basis while the tiles of DP array 302 are connected by multi-bit data paths (e.g., streams) capable of packet-based communication. As illustrated, trace offload circuit architecture 104 is implemented in programmable logic 106.

Processor system 306 is implemented as hardwired circuitry that is fabricated as part of IC 100. Processor system 306 may be implemented as, or include, any of a variety of different processor types each capable of executing program code. For example, processor system 306 may include a central processing unit (CPU) 330, one or more application processing units (APUs) 332, one or more real-time processing units (RPUs) 334, a level 2 (L2) cache 336, an on-chip memory (OCM) 338, an Input/Output Unit (IOU) 340, each interconnected by a coherent interconnect 342. The example CPU and/or processing units of processor system 306 may be implemented using any of a variety of different types of architectures. Example architectures that may be used to implement processing units of processor system 306 may include, but are not limited to, an ARM processor architecture, an x86 processor architecture, a GPU architecture, a mobile processor architecture, a DSP architecture, combinations of the foregoing architectures, or other suitable architecture that is capable of executing computer-readable instructions or program code. In one or more examples, CPU 330 may operate as a host processor (e.g., processor 116 of FIG. 1 or of FIG. 2).

NoC 308 is a programmable interconnecting network for sharing data between endpoint circuits in IC 100. NoC 308 may be implemented as a packet-switched network. The endpoint circuits can be disposed in DP array 302, programmable logic 106, processor system 306, and/or HCBs 312. NoC 308 can include high-speed data paths with dedicated switching. In an example, NoC 308 includes one or more horizontal paths, one or more vertical paths, or both horizontal and vertical path(s). NoC 308 is an example of the common infrastructure that is available within IC 100 to connect selected components and/or subsystems.

Being programmable, nets that are to be routed through NoC 308 may be unknown until a design is created and routed for implementation within IC 100. NoC 308 may be programmed by loading configuration data into internal configuration registers that define how elements within NoC 308 such as switches and interfaces are configured and operate to pass data from switch to switch and among the NoC interfaces to connect the endpoint circuits. NoC 308 is fabricated as part of IC 100 (e.g., is hardwired) and, while not physically modifiable, may be programmed to establish logical connectivity between different master circuits and different slave circuits of a user design.

PMC 310 is an optional subsystem within IC 100 that is capable of managing the other programmable circuit resources (e.g., subsystems) across the entirety of IC 100. PMC 310 is capable of maintaining a safe and secure environment, booting IC 100, and managing IC 100 during normal operations. For example, PMC 310 is capable of providing unified and programmable control over power-up, boot/configuration, security, power management, safety monitoring, debugging, and/or error handling for the different subsystems of IC 100 (e.g., DP array 302, programmable logic 106, processor system 306, NoC 308, and/or HCBs 312). PMC 310 operates as a dedicated platform manager that decouples processor system 306 and from programmable logic 106. As such, processor system 306 and programmable logic 106 may be managed, configured, and/or powered on and/or off independently of one another. In cases where PMC 310 is omitted, the functions of PMC 310 may be implemented using one or more of the processors of processor system 306.

HCBs 312 are special-purpose or application specific circuit blocks fabricated as part of IC 100. Though hardwired, HCBs 312 may be configured by loading configuration data into control registers to implement one or more different modes of operation. Examples of HCBs 312 may include input/output (I/O) blocks (e.g., single-ended and pseudo differential I/Os), transceivers for sending and receiving signals to circuits and/or systems external to IC 100 (e.g., high-speed differentially clocked transceivers), memory controllers (e.g., memory controllers 112), cryptographic engines, digital-to-analog converters (DACs), analog-to-digital converters (ADCs), and the like. In another aspect, one or more HCBs 312 may implement a RAM.

The various programmable circuit resources illustrated in FIG. 3 may be programmed initially as part of a boot process. During runtime, the programmable circuit resources may be reconfigured. In one aspect, PMC 310 or a processor of processor system 306 is capable of initially configuring DP array 302, programmable logic 106, processor system 306, and NoC 308 to implement a user design. At any point during runtime, PMC 310 or another processor may reconfigure all or a portion of IC 100.

IC 100 is provided as an example. Other example architectures for IC 100 may omit certain subsystems described herein and/or include additional subsystems not described herein. Further, the particular subsystems described herein may be implemented differently to have fewer or more components than shown. Particular components common across different tiles of DP array 302 and having same reference numbers such as streaming interconnects 406, CDIs 414, DMA circuits 412, and the like have substantially the same functionality from one tile to another. It should be appreciated, however, that the particular implementation of such circuit blocks may differ from one type of tile to another. As an illustrative and non-limiting example, the number of ports of the streaming interconnect 406 may be different for a compute tile 316 compared to a memory tile 318 and/or an interface tile 322. Similarly, the number of channels of a DMA circuit 412 may be different in a compute tile 316 compared to a memory tile 318 and/or an interface tile 322. Appreciably, in other examples, the circuit blocks may be implemented the same across different tiles.

It should be appreciated that a compute circuit, regardless of whether being implemented as DP array 302 or as another type of CGRA, will include interface circuitry that couples the functional units of compute circuit 102 with other subsystems and/or circuits of IC 100 such as trace offload circuit architecture 104. For purposes of illustration, PL interface 420 is used within this disclosure as an example of such an interface. PL interface 420 or other similar circuitry may be used for different types of compute circuits 102.

Figure 5:
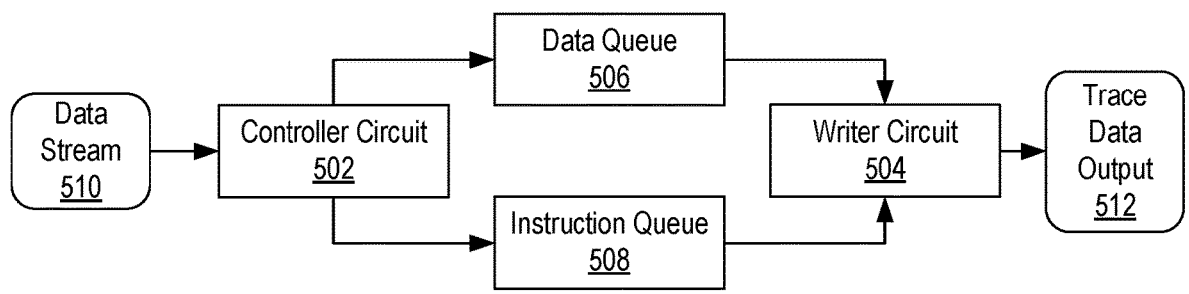
FIG. 5 illustrates an example implementation of a trace data mover circuit of a trace offload circuit architecture.

FIG. 5 illustrates an example implementation of a trace data mover circuit 108. In the example, trace data mover circuit 108 includes a controller circuit 502 and a writer circuit 504. Controller circuit 502 is coupled to writer circuit 504 through a plurality of queues. The plurality of queues include a data queue 506 that is configured to store trace data and an instruction queue 508 that is configured to store instructions generated by controller circuit 502. Each of data queue 506 and instruction queue 508 may be implemented as a hardware first-in-first-out (FIFO) memory.

Trace data mover circuit 108 implements two processes corresponding to controller circuit 502 and writer circuit 504 respectively. The controller process implemented by controller circuit 502 reads trace data received as data stream 510, creates instructions, stores the trace data in data queue 506, and stores the instructions as generated in instruction queue 508. Instruction queue 508 is used to control the write behavior, as implemented by writer circuit 504, at runtime. Trace data may be buffered in data queue 506 until a "write" instruction is generated by controller circuit 502 and stored in instruction queue 508. The write instruction controls whether the trace data is output as a burst data transfer or is flushed out (e.g., word-by-word individually).

The writer process implemented by writer circuit 504, by comparison to the controller process, is less complex. That is, while controller circuit 502 is designed to handle a degree of complexity so that a user or external process (e.g., as implemented by the host processor) may determine whether to stop operation of the trace data mover 108 and flush leftover data in data queue 506, writer circuit 504 implements the simplified writer process that is designed to efficiently write data.

Writer circuit 504 is capable of accessing both data queue 506 and instruction queue 508. Writer circuit 504, based on the instructions obtained from instruction queue 508, writes trace data from data queue 506 as trace data output 512 as one or more burst data transfers. That is, writer circuit 504 obtains (e.g., reads) the instructions from instruction queue 508 and, in response to execution of the instructions as obtained, writes the trace data as trace data output 512 to a destination circuit as specified by an address. In the example, trace data mover circuit 108 is capable of receiving data stream 510 of trace data and outputting the trace data (e.g., trace data output 512) in a memory mapped format directed to a particular address.

For example, in the case where NoC 308 is included, each trace data mover circuit 108 may couple to a PL interface 420 in an interface tile 322 and may represent an endpoint in programmable logic 106 that couples to a NoC master unit (e.g., an ingress or interface to NoC 308). In this regard, each PL interface 420, and thus data stream including trace data, may be generated from a plurality of tiles of compute circuit 102. Though not illustrated, additional buffering may be implemented for the respective data streams of trace data within programmable logic 106, whether prior to trace data mover circuits 108, within trace data mover circuits 108, or following trace data mover circuits 108.

The burst length of the burst data transfers implemented by writer circuit 504, in terms of the number of multi-bit words that are output as a single burst data transfer, is a configurable parameter of trace data mover circuit 108. As part of an initialization process, for example, controller circuit 502 may be initialized with information specifying certain operational settings used during runtime. In one aspect, controller circuit 502 may be initialized with data specifying a burst length. Thus, the burst length of trace data mover circuit 108 may be changed at runtime by reinitialization.

As an illustrative and non-limiting example, writer circuit 504 may be configured to output words of 512 bits and implement burst data transfers of up to 16 words. The number of words of a burst transfer may be specified as any integer value less than or equal to the maximum number of words that the hardware is capable of handling as a burst data transfer (e.g., that the memory controller coupled to trace data mover circuit 108 is capable of handling). Trace data mover circuit 108 may be reinitialized to use a different burst length of any integer between 2 and 16, where 16 is the upper limit of the hardware.

In other cases, depending on the type of communication protocol used, the maximum amount of data that can be transferred as a single burst data transfer is specified as a single number. In such situations, other operational settings such as data width of the words of the burst data transfers and burst size (e.g., number of words in a single burst data transfer) may be varied so long as the maximum allowable amount of data to be transferred in a single burst data transfer is not exceeded.

As noted, leftover data may be flushed out without using burst data transfers. In cases where the amount of trace data available for output, as stored in data queue 506, is less than that of a full burst transfer (e.g., the amount of data includes fewer words that may be included in a single, complete burst transfer), any data stored in data queue 506 may be flushed. Flushing the data from data queue 506 refers to outputting any remaining data one data item or word at a time as opposed to outputting a plurality of words as a single burst data transfer.

Writer circuit 504 is capable of performing a flush in cases where the amount of data stored in data queue 506 is less than the amount of data for a burst data transfer. The flush operation supports the underlying premise of trace in that trace data mover circuit 108, and more particularly controller circuit 502, does not know when trace data will stop coming from compute circuit 102. Controller circuit 502, for example, is unaware of when the user design stops operating and/or when trace functionality may be disabled. Accordingly, the host processor, whether implemented in IC 100 or external to IC 100, may execute a driver that informs trace data mover circuit 108 and, more particularly, controller circuit 502, that the user design is finished operating (e.g., whether by design or by virtue of a crash or hang). When this occurs, whatever data remains in data queue 506 may be written (e.g., flushed) out. Thus, each trace data mover circuit 108 implements a hardware pipeline that can be stopped and flushed upon request.

Each trace data mover circuit 108 is capable of writing data to a memory using one of two different modes. The modes include a linear mode and a circular mode. In the linear mode, writer circuit 504 outputs trace data until a maximum limit is reached and then stops. The maximum limit may be set to a size of a memory bank or a memory buffer within a memory bank. The maximum limit may be a configurable parameter of trace data mover circuit 108.

Figure 6:
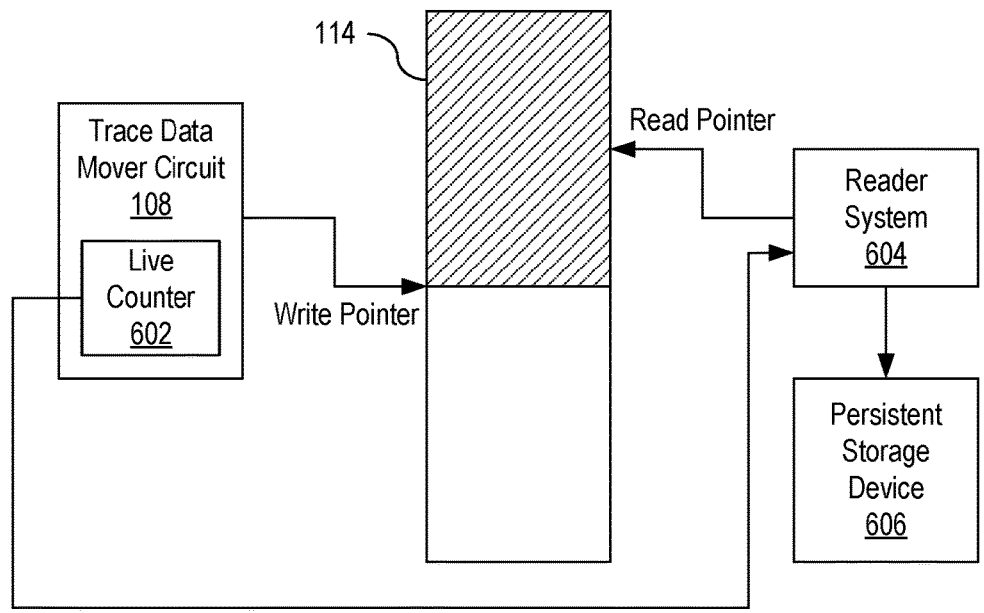
FIG. 6 illustrates certain operative features of a trace data mover circuit.

FIG. 6 illustrates certain operative features of data mover circuit 108. The features may be used in implementing the circular mode. In the circular mode, instead of stopping in response to reaching the maximum limit, trace data mover circuit 108 loops around to the beginning of a portion of memory 114. After looping around, writer circuit 504 overwrites the previously written trace data in the memory.

In the example, data mover circuit 108 includes a live counter 602. Live counter 602 may be implemented as a register or other memory and corresponding logic that is capable of maintaining a count (e.g., the live count) of the amount of data that has been written to memory 114. In one aspect, as live counter 602 maintains a count of the amount of data that has actually been written to memory 114 (e.g., the destination circuit in this example), live counter 602 may be implemented as part of the writer circuit 504 as writer circuit 504 is responsible for implementing the write functionality.

The circular mode requires a reader system 604 to query trace data mover circuit 108 for the live count and synchronize the reading to make sure the trace data is read from the memory before the trace data is overwritten. In one or more example implementations, the live count stored in live counter 602 of each writer circuit 504 may be made available, e.g., readable, by systems and/or a user external to IC 100. As discussed, in the case of a conventional data mover, the amount of data expected is known. If, for example, 1 MB of buffer is used, and only 500 KB of data are output, a conventional data mover will hang. Live counter 602 is not needed in conventional data movers since the components know how much data is being transferred. In the case of trace data mover circuit 108, live counter 602 may be used to indicate the amount of data collected in case the design for which trace is being performed crashes. Thus, the user has at least a partial trace with a known amount of data as of the time of the crash or other unexpected event.

In this example, reader system 604 may query writer circuit 504 for the live count from live counter 602. The circular mode allows a given buffer in memory 114 to be re-used potentially ad-infinitum. In the example, the shaded portion of memory 114 represents trace data stored therein. Data mover circuit 108 continues to write data at the write pointer with live counter 602 updating the live count dynamically as trace data is written to memory 114 during runtime. Reader system 604 may read the trace data at the read pointer location and store the trace data as read in a persistent storage device. For example, reader system 604 may be another processor and/or computer system where persistent storage device 606 may be a non-volatile storage device coupled to, or included within, reader system 604. Reader system 604 uses the live count to ensure that trace data is read from memory 114 prior to being overwritten with new data in the circular mode.

When operating in the circular mode, controller circuit 502 generates instructions that are stored in instruction queue 508. Controller circuit 502 is capable of generating one instruction per burst data transfer to be performed by writer circuit 504. Any time that writer circuit 504 detects an instruction in instruction queue 508, writer circuit 504 expects data to be present in data queue 506. Writer circuit 504 moves the data in accordance with the instruction (e.g., performs a burst data transfer to an address or performs a write of a single word to an address).

In either the linear mode or the circular mode, software executed by the reader system 604 is capable of implementing continuous offload of trace data. This involves a dedicated thread of execution in the reader system 604 that periodically queries trace data mover circuit 108 to obtain the live count. Trace data mover circuit 108 returns the live count of written trace data. Reader system 604 is capable of synchronizing the partial trace data into its own memory (e.g., persistent storage device 606). The partial trace data may be processed by reader system 604 and then immediately moved to persistent storage device 606 (e.g., a hard disk, SD card, or the like). In case of a crash, the partial trace data is available and can be salvaged and used for debugging.

In the example, as discussed, the live count may be used by reader system 604 to ensure that data is read from memory 114 prior to being overwritten in the case of the circular mode. In both the circular and linear mode, the live count may be used by reader system 604 to determine the amount of trace data obtained particularly in the event of a crash, hang, or other unexpected event occurring during runtime of the user design. An example of a reader system is illustrated as the data processing system of FIG. 13.

Figure 7:
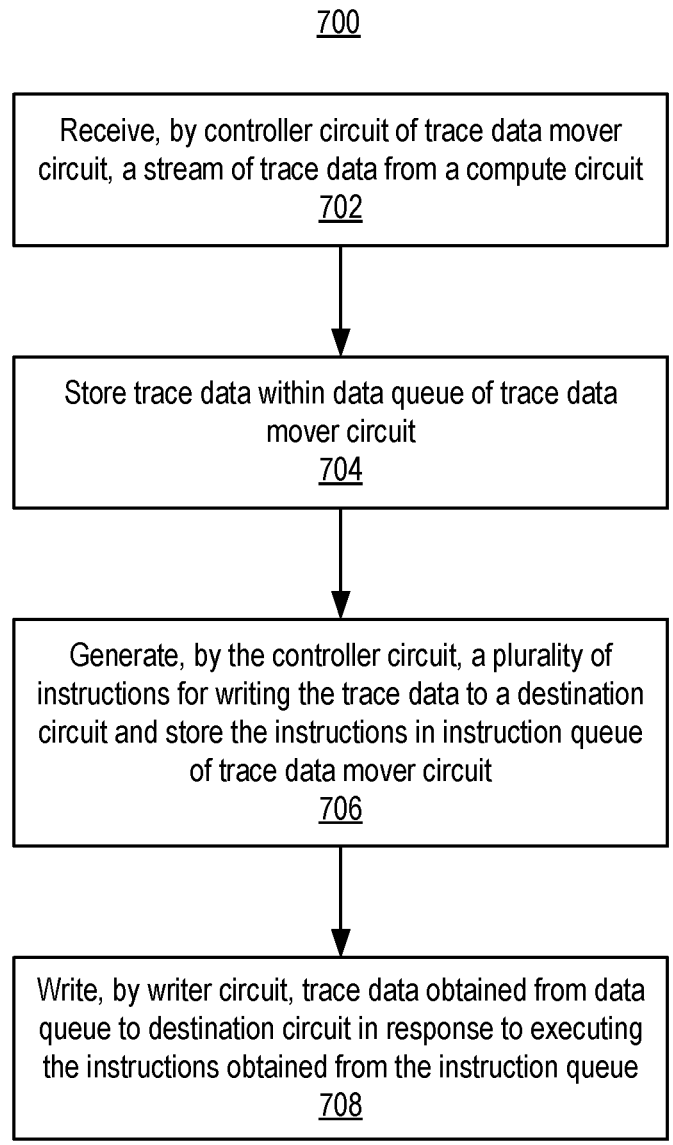
FIG. 7 illustrates an example method of operation for a trace data mover circuit.

FIG. 7 illustrates an example method 700 of operation for trace data mover circuit 108. Method 700 may be implemented by each of the different trace data mover circuits 108 implemented as part of trace offload circuit architecture 104 within IC 100. Each trace data mover circuit 108 may operate in parallel and independently of the other trace data mover circuits while implementing method 700.

In block 702, during operation of compute circuit 102, controller circuit 502 of trace data mover circuit 108 receives a data stream 510 of trace data from one or more functional units of compute circuit 102. In block 704, in response to receiving the stream of trace data, controller circuit 502 stores the trace data within data queue 506. In block 706, controller circuit 502 generates a plurality of instructions for writing the trace data to a destination circuit (e.g., memory 114 by way of memory controller 112). Controller circuit 502, as part of block 706, stores the plurality of instructions in instruction queue 508. In block 708, writer circuit 504 writes trace data obtained from data queue 506 to the destination circuit in response to executing the plurality of instructions obtained from instruction queue 508.

The method also may include controller circuit 502 instructing writer circuit 504 to flush data from data queue 506 in response to receiving a flush request. The flush request may be received from the host processor.

Figure 8:
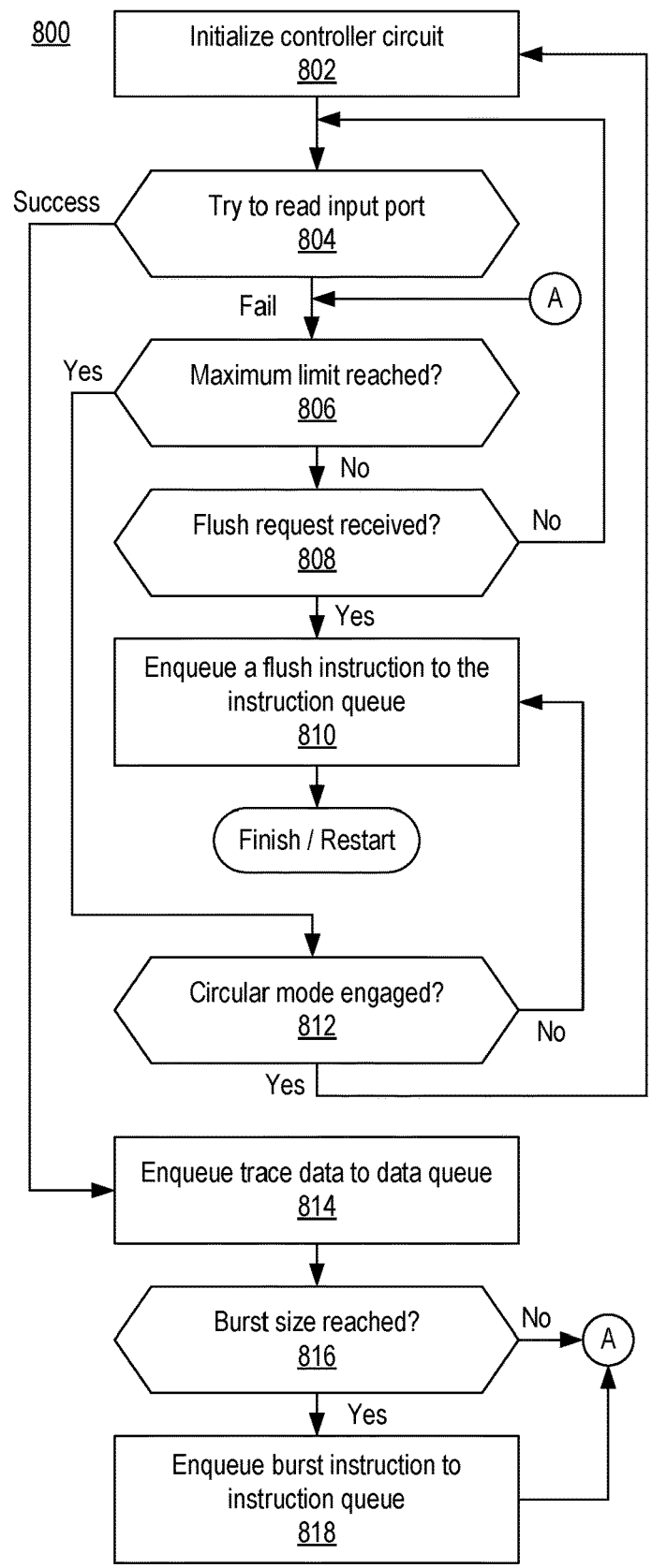
FIG. 8 illustrates an example method of operation for a controller circuit of a trace data mover circuit.

FIG. 8 illustrates an example method 800 of operation for a controller circuit of data mover circuit 108. Method 800 illustrates an example implementation of the controller process briefly described hereinabove. In the example of FIG. 8, controller circuit 502 is initialized. As discussed, as part of the initialization, controller circuit 502 is loaded with a burst size for performing burst data transfers. The burst size specifies the number of words conveyed for each burst data transfer. Other examples of runtime parameters that may be loaded during block 802 can include, but are not limited to, one or more or all of the following: a maximum amount of memory to use (e.g., the "maximum limit") and whether trace data mover circuit 108 will operate using the linear mode or the circular mode.

In block 804, controller circuit 502 tries to read trace data from an input port thereof. In response to successfully reading trace data (e.g., determining that trace data is present on the input port), method 800 continues to block 814. In response to a failed attempt to read data from the input port, method 800 continues to block 806.

Proceeding with block 814, controller circuit 502 enqueues, e.g., writes, the trace data read from the input port into data queue 506. In block 816, controller circuit 502 determines whether the burst size has been reached. That is, controller circuit 502 determines whether an amount of data equivalent to the burst size has been stored in data queue 506. In response to determining that the burst size has not been reached, method 800 loops back to block 806. In response to determining that the burst size has been reached, method 800 continues to block 818. In block 818, controller circuit 502 enqueues a burst instruction to instruction queue 508. After block 818, method 800 loops back to block 806. In this example, method 800 branches in response to reaching the burse size since there is sufficient data available to create a burst and for the writer to send out the data.

Continuing with block 806, controller circuit 502 determines whether the maximum amount of memory, e.g., the maximum limit, as specified during initialization, has been written. Trace data mover circuit 108 has access to a predetermined amount of memory. The size and address of that predetermined amount of memory are set at initialization. This amount of memory is treated as a maximum limit. When the amount of memory is used, controller circuit 502 checks whether circular mode is enabled. Because circular mode may be enabled at runtime, the check must be performed during execution and may cause a branch as illustrated.

In one aspect, controller circuit 502 is capable of querying live counter 602. Controller circuit 502 may compare the live count from live counter 602 with the maximum limit. In response to determining that the live count is equal to the maximum limit, controller circuit 502 determines that the maximum limit has been reached and continues to block 812. In response to determining that the live count is less than the maximum limit, controller circuit 502 determines that the maximum limit has not been reached and proceeds to block 808.

Continuing with block 812 where the maximum limit has been reached, controller circuit 502 determines whether the circular mode is engaged. In response to determining that the circular mode is engaged, method 800 continues to block 802 where the controller circuit is initialized to continue writing data from the beginning of the circular buffer. In response to determining that the circular mode is not engaged, method 800 continues to block 810 where controller circuit 502 enqueues a flush instruction to instruction queue 508. Controller circuit 502 enqueues a flush instruction to instruction queue 508 since the amount of trace data stored in data queue 506 did not reach the burst size and the circular mode is not engaged. After block 810, method 800 may end or be restarted.

In the case where the maximum limit was not reached in block 806, method 800 continues to block 808. In block 808, controller circuit 502 determines whether a flush request has been received from the host processor. Only the host has knowledge of when the application is done. This condition, the application being done, may be indicated by a flush request to trace data mover circuit 108. Trace data mover circuit 108 must check for this condition during execution. In response to receiving a flush request, method 800 continues to block 810 to enqueue a flush instruction to instruction queue 508. In response to determining that a flush request has not been received, method 800 loops back to block 804 to continue processing. In block 804, controller circuit 502, not having been stopped or requested to flush data, again tries to read trace data from the input port.

Figure 9:
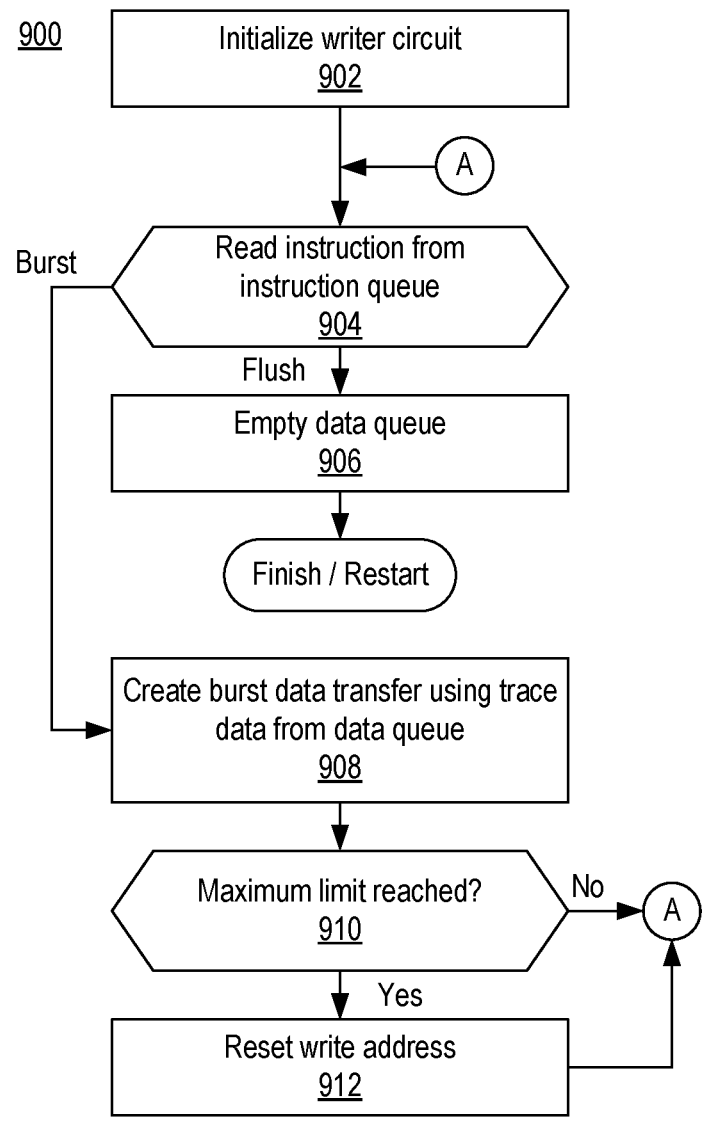
FIG. 9 illustrates an example method of operation for a writer circuit of a trace data mover circuit.

FIG. 9 illustrates an example method 900 of operation for writer circuit 504 of trace data mover circuit 108. Method 900 illustrates an example implementation of the writer process briefly described hereinabove.

In block 902, writer circuit 504 is initialized. During initialization, the burst size is set for writer circuit 504. In addition, a starting or base address may be set. In block 904, writer circuit 504 reads an instruction from instruction queue 508. In response to determining that the instruction is a burst instruction, method 900 continues to block 908. In response to determining that the instruction is a flush instruction, method 900 continues to block 906.

Continuing with block 908, writer circuit 504 creates a burst data transfer using the trace data read from data queue 506. In general, writer circuit 504 may generate write addresses based on the starting or base address, the burst size, and/or the word size. In block 910, writer circuit 504 determines whether the maximum limit is reached. In response to determining that the maximum limit has not been reached, method 900 loops back to block 904 to continue operating. In response to determining that the maximum limit has been reached, method 900 continues to block 912 where the write address is reset to the starting or base address. After block 912, method 900 loops back to block 904.

Continuing with block 906, writer circuit 504 empties data queue 506. For example, writer circuit 504 reads each word of data from data queue 506 and initiates individual write operations to empty (e.g., flush) data queue 506 word-by-word instead of implementing a burst data transfer.

The examples of FIGS. 8 and 9 illustrate how trace data mover circuit 108 is capable of waiting for more data to continue generating burst data transfers even in cases where operation of compute circuit 102 is paused or stalled. By comparison, upon being informed of a stopping condition, e.g., receiving a flush request from the host processor, the remaining data in data queue 506 is emptied. The host processor, for example, may be the same entity that is controlling operation of compute circuit 102 (and/or functional units therein) and is aware of whether the user's design operating in compute circuit 102 has stopped whether by design or by virtue of a stall or other unexpected event such as a crash or hang.

The example architecture of trace data mover circuit 108 described herein, having controller circuit 502 and a separate writer circuit 504, facilitates high performance operation. Controller circuit 502 operates independently of writer circuit 504. While writer circuit 504 is writing to the memory, writer circuit 504 is completely blocked and cannot simultaneously process incoming data. Controller circuit 502 may process incoming data. Further, making control decisions such as branching as described herein requires hardware resources. Such decisions also incur at least a one clock cycle latency. Were the functionality of controller circuit 502 and writer circuit 504 to be included in a single circuit block or entity, the achievable burst length would be limited to 1, thereby significantly degrading performance. In addition, because writer circuit 504, being separated from controller circuit 502, is relatively simplified, pipelining may be implemented at the burst level. This means that, while the previous burst is in process, writer circuit 504 is capable of preparing another burst data transfer in the background to be sent out as soon as the previous burst data transfer is done. This also improves performance at a given burst level.

In one or more examples, with trace offload circuit architecture 104 being implemented in programmable logic 106, a variety of operational settings of trace offload circuit architecture 104 may be configurable. As discussed, one or more of these operational settings may be configured (e.g., set) at compile time and used by the implementation tools to implement the user design in IC 100 with trace offload circuit architecture 104 implemented therein as described. One or more operational settings (e.g., same operational settings and/or other operational settings) may be changed or set at runtime (e.g., during the initialization steps of FIGS. 8 and/or 9).

For example, at compile time, an operational setting specifying the number of trace data mover circuits 108 may be defined. The number of trace data mover circuits 108 may be determined based on an amount of trace data expected to be generated, the number of data streams used to convey trace data, required bandwidth for trace data, and/or available resources within IC that are still available even after the user's design is implemented. In one aspect, the number of trace data mover circuits 108 may be a user-specified value. In another aspect, the number of trace data mover circuits 108 may be determined automatically based on the aforementioned factors (e.g., amount of trace data expected to be generated, number of data streams used to convey trace data, required bandwidth for trace data, and/or available resources within IC that are still available even after the user's design is implemented).

Examples of operating parameters that may be specified at runtime may include, but are not limited to, the burst size and/or the size of the buffer of memory 114 to be used at runtime specified as the maximum limit (e.g., whether circular or linear). In another aspect, operating parameters such as the recovery of the partial trace may be defined or changed at runtime. As noted, a flush can be initiated at any time by the host or the user.

In one or more examples, the amount of trace resources (e.g., trace data mover circuits 108) needed for a given compute circuit 102 may depend on factors such as the number of functional units (e.g., compute tiles) used by the user design, the amount of data streams available (e.g., number of available data streams unused by the user design), the required bandwidth of the user design at runtime (e.g., without trace), and/or the granularity of trace desired.

For example, there are a limited number of ports of the streaming interconnects 406 and/or other switches that may be included in a mesh network coupling functional units. Similarly, PL interface 420 supports a limited or finite number of data streams. The number of such data streams left, e.g., unused by the user design, are available for conveying trace data.

In implementing trace offload circuit architecture 104, the bandwidth available is defined by the number of available data streams. In addition, the bandwidth may be constrained by the available resources in programmable logic 106. These constraints may limit the bandwidth achievable by trace offload circuit architecture 104. In addition, in cases where trace offload circuit architecture 104 couples to an interconnect circuit 110 such as NoC 308, the available bandwidth of these circuits may further constrain the bandwidth achievable by trace offload circuit architecture 104. That is, trace data may be conveyed over data paths of interconnect circuit 110 and/or NoC 308 that are not being used by the user design.

These factors may constrain the granularity of trace operations that may be performed at runtime of the user design. Larger granularity or obtaining more trace data requires a trace offload circuit architecture 104 with greater bandwidth capability. In this regard, the number of trace data mover circuits 108 implemented within trace offload circuit architecture 104 may be dictated by the bandwidth required to move the desired trace data (e.g., number of data streams of trace data), the available bandwidth and/or number of data streams in the hardware through which the trace data is conveyed, the availability of circuit resources in programmable logic 106, and/or whether data streams may be merged without comingling packets (e.g., packets must remain intact such that any given packet does not have beats of data separated by beats of data of other packets).

Figure 10:
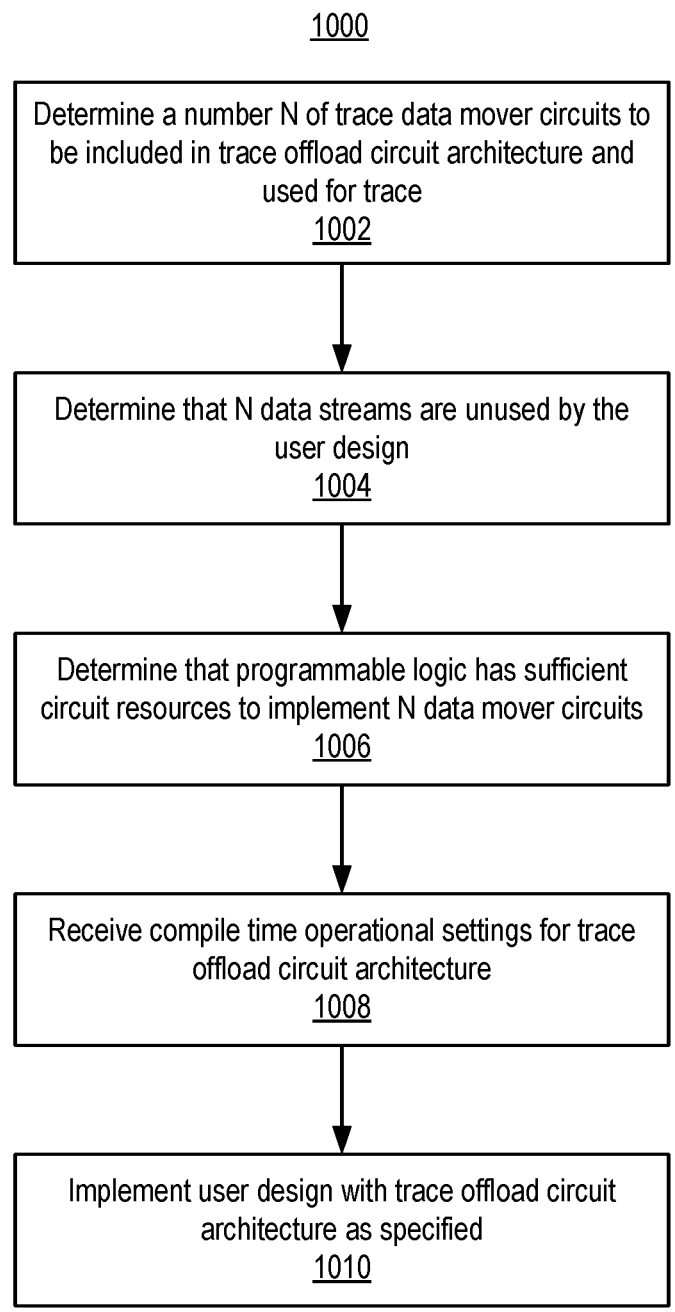
FIG. 10 illustrates an example method of implementing a trace offload circuit architecture using computer-based implementation tools.
Figure 13:
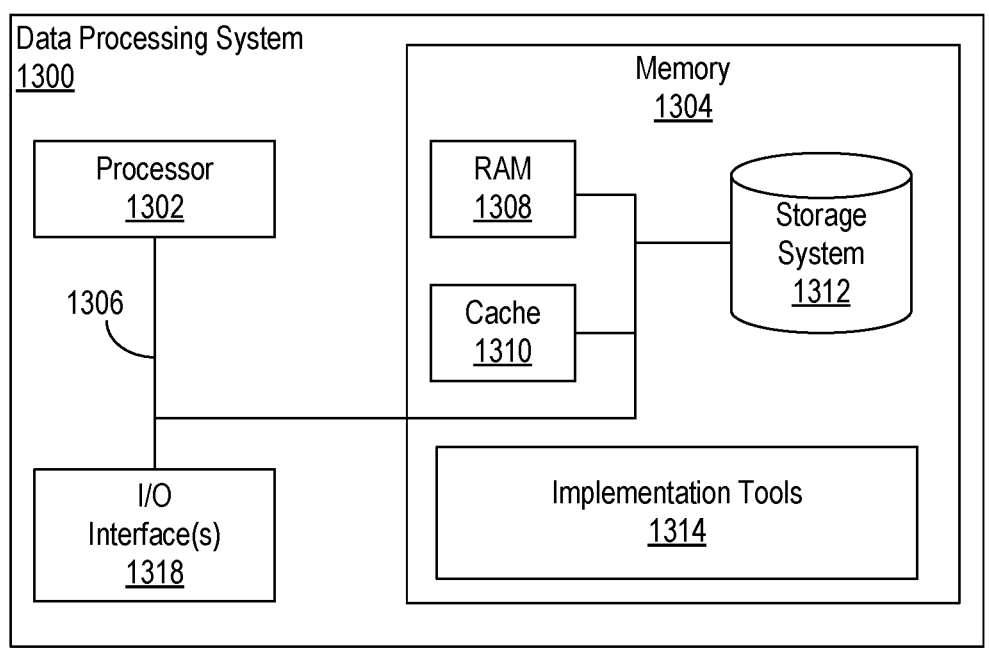
FIG. 13 illustrates an example implementation of a data processing system for use with the inventive arrangements described within this disclosure.

FIG. 10 illustrates an example method 1000 of implementing trace offload circuit architecture 104 using computer-based implementation tools (e.g., a "system"). An example of a data processing system capable of performing method 1000 is illustrated in FIG. 13.

In block 1002, the system determines a number "N" of trace data mover circuits 108 to be included in trace offload circuit architecture 104 and used for performing trace of a user design. For example, based on the foregoing factors, a count N of trace data mover circuits 108 may be determined. This may be an estimation provided by the user to the implementation tools as a user input.

In block 1004, the system determines whether N data streams of the total number of available data streams of IC 100 are not being used by the user design. For example, given the availability of the user design and a known number of data streams available for the particular IC 100 being used as the target device, the system determines whether at least N data streams are not being used by the user design and, as such, may be used for trace to convey data streams of trace data to the trace data mover circuits 108.

In block 1006, the system determines whether the programmable logic 106 has sufficient circuit resources to implement N trace data mover circuits 108 therein. For example, given the availability of the user design and that the user design may specify other circuit blocks to be implemented in programmable logic 106 along with trace offload circuit architecture 104, the system determines whether programmable logic 106 includes enough circuit resources to implement the N trace data mover circuits 108.

In block 1008, the system receives, e.g., as user input, any compile time operational settings for the trace offload circuit architecture 104 to be created. Examples of the compile time operational settings that may be received may include, but are not limited to, one or more or all of the following: internal and/or external data queue size, data width(s), and burst size. Larger sized data queues can handle higher throughput (e.g., bandwidths) of trace data but require more resources of programmable logic 106. The data widths refer to the bit-width of the words read and/or written per clock cycle. The data width may be specified for the incoming data stream and the trace data as output and may be specified independently. As an example, while both incoming trace data and outgoing trace data for a trace data mover circuit 108 may be the same, in other cases, the widths may be different. As an example, a data stream of trace data that is 64 bits wide may be received by controller circuit 502 while writer circuit 504 writes words of 128 bits or more as output. In general, a word of data is defined as an amount of data equal to the data-width of writer circuit 504.

In block 1010, since N data streams are unused and programmable logic 106 does have sufficient circuit resources, the system implements the user design including the trace offload circuit architecture as specified. For example, the system is capable of compiling the user design and the trace offload circuit architecture, performing synthesis as required, performing placement as required, performing routing as required, and generating configuration data that, when loaded into IC 100, implements the user design inclusive of trace offload circuit architecture 104 therein.

In one or more other examples, the system may combine two or more data streams of trace data to limit the number of data streams carrying trace data coming out of compute circuit 102 and/or by multiplexing the trace data of multiple streams into fewer (e.g., a single) data stream of trace data prior to reaching trace data mover circuits 108 thereby requiring fewer trace data mover circuits 108. While combining data streams of trace data may save on circuit resources of IC 100 (e.g., require fewer resources of programmable logic 106), the combining does not reduce the overall bandwidth required of trace offload circuit architecture 104.

The entire construction of trace offload circuit architecture 104 occurs at the time of compilation of the user design for implementation (e.g., physical realization in) IC 100. Each of the N trace data mover circuits 108 of trace offload circuit architecture 104 may be compiled with the user design according to the user's requirements to convey trace data generated by multiple tiles and/or functional units of compute circuit 102.

The various compile time and/or runtime settings for trace data mover circuits 108 described herein give precise control over trace bandwidth and performance. Further, these settings may be adjusted on a per-user design basis. For example, runtime settings may be adjusted to optimize and/or vary performance of trace offload circuit architecture 104 for a particular user design and/or type of trace to be performed. As an illustrative and non-limiting example, tracking stalls within functional units and/or tiles of compute circuit 102 may generate more data and require a higher bandwidth. To adequately track stalls, a higher burst size may be required. This can be set at compile time and also changed at runtime. Burst length also may be modified at runtime since memory controllers are shared with other data streams that may convey actual data from memory that is consumed by compute circuit 102 and/or convey data generated by compute circuit 102 to memory. Larger burst sizes tie up the memory controller making it unavailable to convey actual data (e.g., non-trace data) of compute circuit 102 and/or other subsystems in IC 100. This may require one to use lower burst sizes to ensure that other subsystems including compute circuit 102 in executing the user design continue to function as expected.

In another example, the maximum limit (amount of memory to be used by each trace data mover circuit 108) and/or the operating mode may be changed at runtime.

In one or more example implementations, the system may automatically insert one or more trace data mover circuits into the user design given certain user-specified information. For example, the user may specify the number of trace data mover circuits to include or insert. Other data that optionally may be provided by the user to the system to facilitate automated insertion of trace data mover circuits may include a width of the trace data interface for the trace data mover circuits, a burst size, the designation of a particular memory resource to which the trace data mover circuit is to write data, and a depth of the queues (506, 508).

In other examples, the system may determine one or more of the aforementioned parameters automatically. For example, for a given number of specified trace data mover circuits, a system may check the user design to determine a number of functional circuits in use. The system may vary the number of trace data mover circuits used based on the number of functional circuits in use in the user design. The system may increase/decrease widths of the trace data mover circuits to meet timing requirements as higher widths can achieve high performance at lower clock speeds. The system may determine burst size based on memory access patterns of the user design. For a memory intensive user design, the burst size may be set lower so that operation of a trace data mover circuit does not impact the memory access patterns of the actual design in operation (e.g., at runtime). To avoid this issue, the system may select a different memory than is used by the user design for purposes of trace. The system may set or adjust the depth of the queues based on desired performance of the trace data mover circuit and the availability of circuit resources if implemented using programmable logic. Higher queue depths can absorb higher instantaneous bandwidth.

Figure 11:
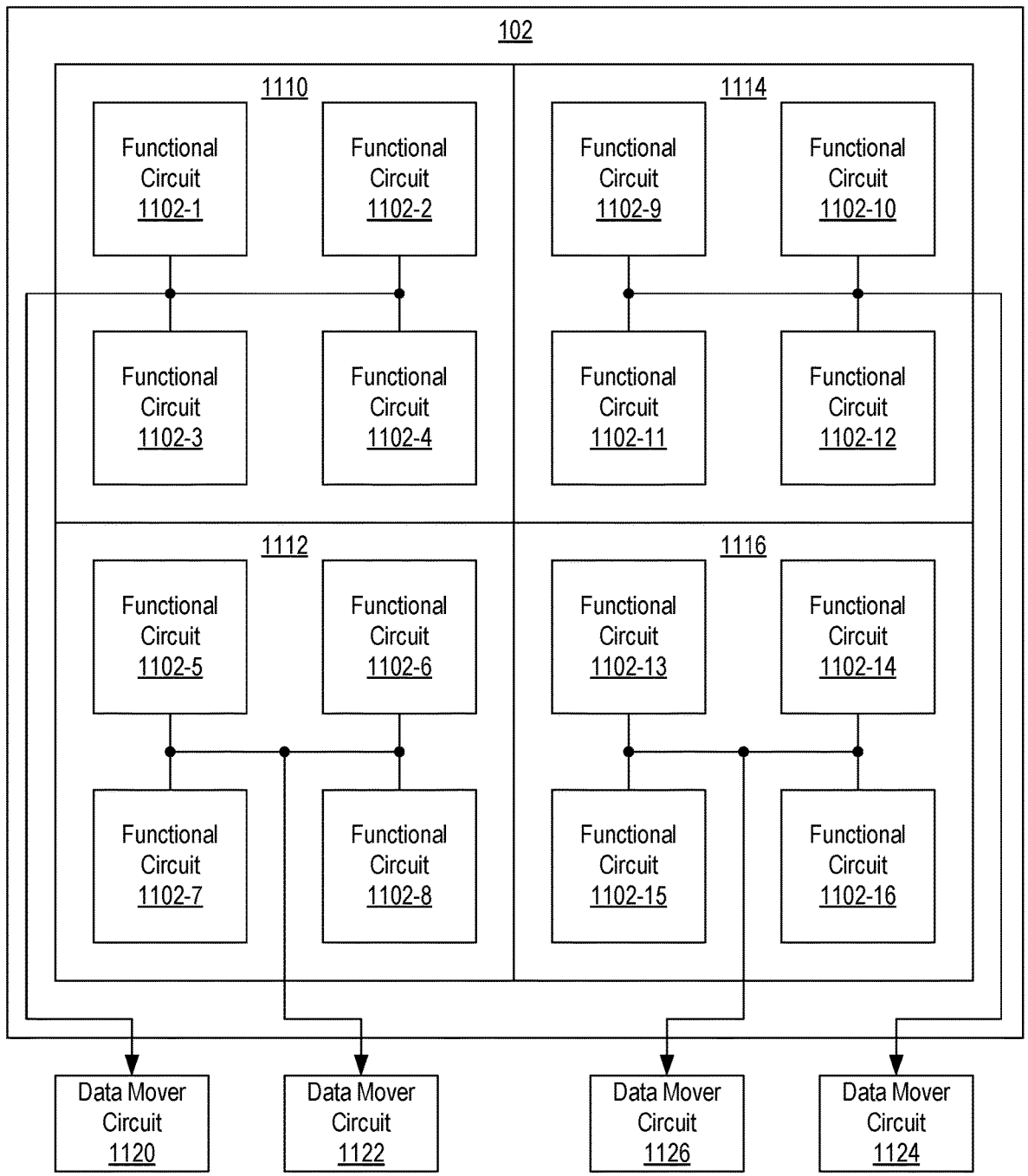
FIG. 11 illustrates an example of a compute circuit including a plurality of functional circuits.

FIG. 11 illustrates an example of compute circuit 102 including a plurality of functional circuits organized into partitions. In the example, compute circuit 102 is implemented as a CGRA type of compute circuit. As illustrated, compute circuit 102 includes a plurality of functional circuits 1102 (1102-1 through 1102-16). In one or more examples, functional circuits 1102 may be implemented as compute tiles 316. In one or more other examples, functional circuits 1102 may be implemented as other types of programmable circuit elements that may be included in a CGRA as described herein (adders, multipliers, DSPs, GPUs, etc.). In still one or more other examples, functional circuits 1102 may be implemented as hardened ASIC circuit blocks.

In the example, functional circuit blocks 1102 are organized into a plurality of partitions 1110, 1112, 1114, and 1116. Each partition is coupled to its own dedicated data mover circuit that may be used to offload trace data. For example, partition 1110 is coupled to data mover circuit 1120. Partition 1112 is coupled to data mover circuit 1122. Partition 1114 is coupled to data mover circuit 1124. Partition 1116 is coupled to data mover circuit 1126. Each partition 1110, 1112, 1114, and 1116 may execute a different application and may operate independently of the other. Each of data mover circuits 1120, 1122, 1126, and 1124 may be implemented as a hardened version of trace data mover circuit 108 as described herein.

In one or more examples, the connections between functional circuits 1102 of a given partition and the corresponding data mover circuit may be implemented as hardened connections. In this regard, the partitioning may be fixed. It should be appreciated, however, that the particular number of partitions shown and the particular number of functional circuits illustrated in the partitions are not intended as a limitations of the inventive arrangements. Other numbers of functional circuits, partitions, and/or allotment of functional circuits to partitions may be implemented. In the case where additional partitions are included, additional data mover circuits may be added. A one-to-one relationship may be implemented between partitions and data mover circuits.

Figure 12:
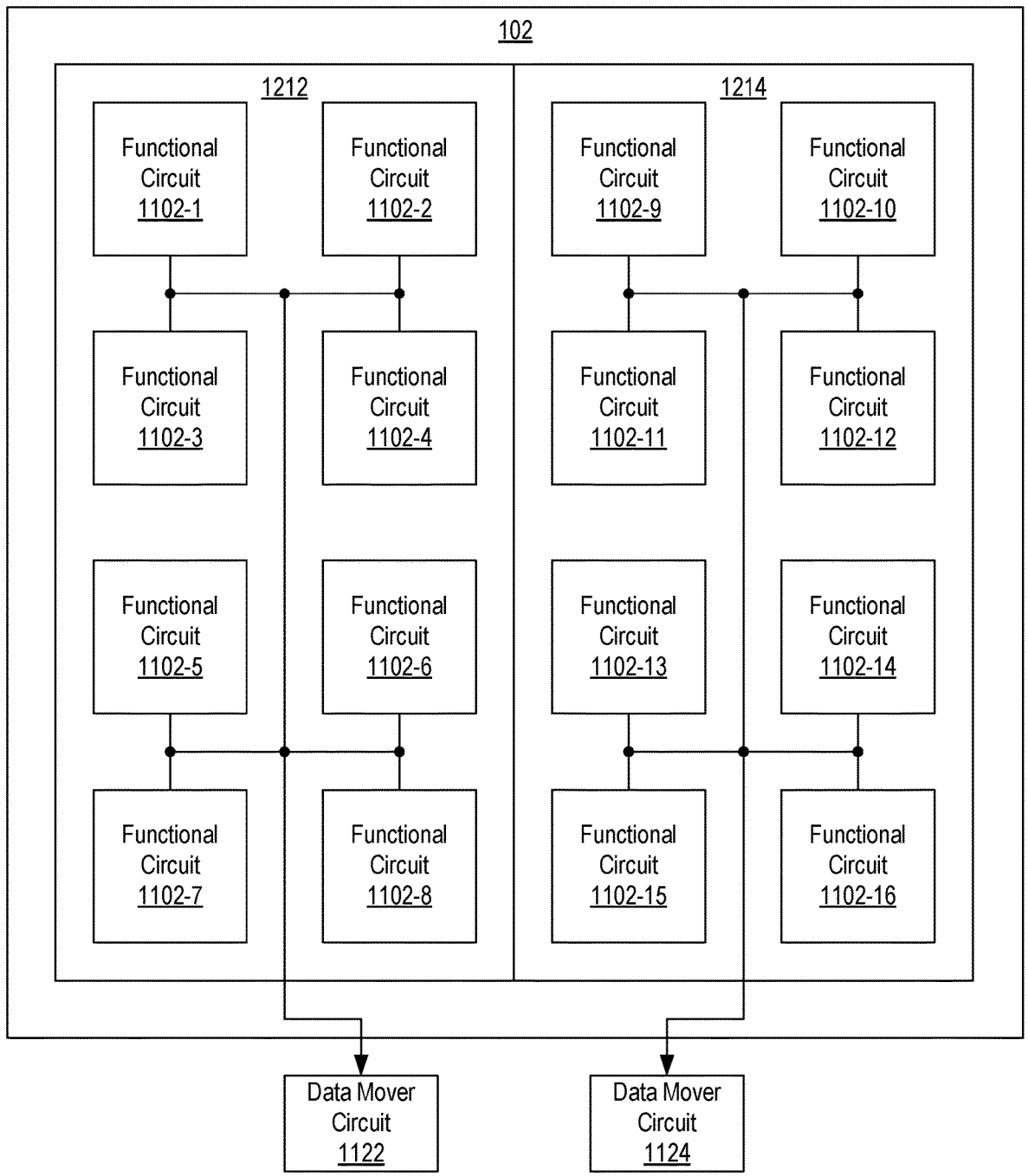
FIG. 12 illustrates another example of a compute circuit including a plurality of functional circuits.

FIG. 12 illustrates another example of a compute 102 circuit including a plurality of functional circuits organized into partitions. In the example, compute circuit 102 is implemented as a CGRA type of compute circuit. As illustrated, compute circuit 102 includes a plurality of functional circuits 1102 (1102-1 through 1102-16). In one or more examples, functional circuits 1102 may be implemented as compute tiles 316. In one or more other examples, functional circuits 1102 may be implemented as other types of programmable circuit elements that may be included in a CGRA as described herein (adders, multipliers, DSPs, GPUs, etc.). In still one or more other examples, functional circuits 1102 may be implemented as hardened ASIC circuit blocks.

In the example, functional circuit blocks 1102 are organized into partitions 1212 and 1214. Each partition 1212 and 1214 may execute its own application and may operate independently of the other. Each partition, and thus application, is coupled to its own dedicated data mover circuit that may be used to offload trace data. For example, application 1212 is coupled to data mover circuit 1122. Application 1214 is coupled to data mover circuit 1124. In this example, data mover circuits may be implemented in programmable circuitry or programmable logic. For example, each of data mover circuits 1122 and 1124 may be implemented as trace data mover circuit 108 as described herein.

In the example, the connections between functional circuits 1102 of a given partition and the corresponding data mover circuit may be implemented as programmable connections. In this regard, the partitioning may be programmable or modifiable. The particular number of partitions shown and the particular number of functional circuits illustrated in the partitions are not intended as a limitations of the inventive arrangements. Other numbers of functional circuits, partitions, and/or allotment of functional circuits to partitions may be implemented. In the case where additional partitions are included, additional data mover circuits may be added. Because the connections are configurable and the data mover circuits are implemented in programmable circuitry, the relationship between a given partition and the data mover circuits may be a one-to-one relationship or one partition to a plurality of data mover circuits.

FIG. 13 illustrates an example implementation of a data processing system 1300. Data processing system 1300 is capable of executing software-based implementation tools that are capable of compiling a user design for implementation in IC 100. As defined herein, the term "data processing system" means one or more hardware systems configured to process data, each hardware system including at least one processor and memory, wherein the processor is programmed with computer-readable instructions that, upon execution, initiate operations. Data processing system 1300 can include a processor 1302, a memory 1304, and a bus 1306 that couples various system components including memory 1304 to processor 1302.

Processor 1302 may be implemented as one or more processors. In an example, processor 1302 is implemented as a central processing unit (CPU). Processor 1302 may be implemented as one or more circuits capable of carrying out instructions contained in program code. The circuit may be an integrated circuit or embedded in an integrated circuit. Processor 1302 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1306 represents one or more of any of a variety of communication bus structures. By way of example, and not limitation, bus 1306 may be implemented as a Peripheral Component Interconnect Express (PCIe) bus. Data processing system 1300 typically includes a variety of computer system readable media. Such media may include computer-readable volatile and non-volatile media and computer-readable removable and non-removable media.

Memory 1304 can include computer-readable media in the form of volatile memory, such as random-access memory (RAM) 1308 and/or cache memory 1310. Data processing system 1300 also can include other removable/non-removable, volatile/non-volatile computer storage media. By way of example, storage system 1312 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1306 by one or more data media interfaces. Memory 1304 is an example of at least one computer program product.

Memory 1304 is capable of storing computer-readable program instructions that are executable by processor 1302. For example, the computer-readable program instructions can include an operating system, one or more application programs such as implementation tools 1314, other program code, and program data. Implementation tools 1314, for example, may be part of an Electronic Design Automation (EDA) application (not shown). Implementation tools 1314 may include software that is executable by processor 1302 to perform a design flow (e.g., synthesis, placement, and/or routing) on a user's design or portion thereof so that a design may be physically realized in IC 100.

Processor 1302, in executing the computer-readable program instructions, is capable of performing the various operations described herein that are attributable to a computer. It should be appreciated that data items used, generated, and/or operated upon by data processing system 1300 are functional data structures that impart functionality when employed by data processing system 1300. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1300 may include one or more Input/Output (I/O) interfaces 1318 communicatively linked to bus 1306. I/O interface(s) 1318 allow data processing system 1300 to communicate with one or more external devices and/or communicate over one or more networks such as a local area network (LAN), a wide area network (WAN), and/or a public network (e.g., the Internet). Examples of I/O interfaces 1318 may include, but are not limited to, network cards, modems, network adapters, hardware controllers, etc. Examples of external devices also may include devices that allow a user to interact with data processing system 1300 (e.g., a display, a keyboard, and/or a pointing device) and/or other devices such as accelerator card.

Data processing system 1300 is only one example implementation. Data processing system 1300 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 13 is not intended to suggest any limitation as to the scope of use or functionality of example implementations described herein. Data processing system 1300 is an example of computer hardware that is capable of performing the various operations described within this disclosure. In this regard, data processing system 1300 may include fewer components than shown or additional components not illustrated in FIG. 13 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow.

It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An integrated circuit, comprising:
   a compute circuit; and
   a trace data mover circuit coupled to the compute circuit and configured to convey trace data generated by the compute circuit to a destination circuit;
   wherein the trace data mover circuit includes:
      a controller circuit configured to receive a stream of trace data from the compute circuit and generate instructions for writing the trace data; and
      a writer circuit configured to write the trace data to the destination circuit using burst data transfers responsive to the instructions generated by the controller circuit;
   wherein the controller circuit is coupled to the writer circuit through a data queue configured to store the trace data and an instruction queue configured to store the instructions generated by the controller circuit; and
   wherein the controller circuit is configured to enqueue a flush instruction to the instruction queue in response to receiving a flush request from a host processor, the flush instruction instructing the writer circuit to flush data from the data queue.

2. The integrated circuit of claim 1, wherein an amount of data flushed in response to the flush request is less than an amount of data for a burst data transfer.

3. The integrated circuit of claim 1, wherein the writer circuit obtains the instructions from the instruction queue and, in response to execution of the instructions as obtained, writes the trace data to the destination circuit.

4. The integrated circuit of claim 1, wherein the compute circuit is implemented as a Coarse Grain Reconfigurable Architecture compute circuit.

5. The integrated circuit of claim 1, wherein the compute circuit is implemented as a data processing array.

6. The integrated circuit of claim 1, further comprising:
   programmable logic coupled to the compute circuit, wherein the trace data mover circuit is implemented in the programmable logic.

7. The integrated circuit of claim 1, wherein the destination circuit is a memory.

8. The integrated circuit of claim 1, further comprising:
   a network-on-chip coupling the trace data mover circuit to the destination circuit.

9. The integrated circuit of claim 1, wherein the trace data mover circuit is runtime configurable.

10. The integrated circuit of claim 1, wherein the burst data transfers have a configurable size.

11. The integrated circuit of claim 1, wherein the trace data mover circuit is configurable to write data to the destination circuit using a linear mode or a circular mode.

12. A method, comprising:
- in response to receiving, by a controller circuit of a trace data mover circuit, a data stream of trace data from a compute circuit, storing the trace data within a data queue of the trace data mover circuit;
- generating, by the controller circuit, a plurality of instructions for writing the trace data to a destination circuit and storing the plurality of instructions in an instruction queue of the trace data mover circuit; and
- writing, by a writer circuit, the trace data obtained from the data queue to the destination circuit using burst data transfers in response to executing the plurality of instructions obtained from the instruction queue;
- wherein the controller circuit is coupled to the writer circuit through the data queue and the instruction queue; and
- enqueuing, by the controller circuit, a flush instruction to the instruction queue in response to receiving a flush request from a host processor, wherein the flush instruction instructs the writer circuit to flush data from the data queue.

13. The method of claim 12, wherein a size of the burst data transfers is configurable.

14. The method of claim 12, wherein the writer circuit is configurable to write the trace data to the destination circuit using a linear mode or a circular mode.

15. The method of claim 12, wherein an amount of data flushed in response to the flush request is less than an amount of data for a burst data transfer.

* * * * *